June 17, 1952 P. L. SPENCER 2,601,067
COFFEE BREWING
Filed March 24, 1948
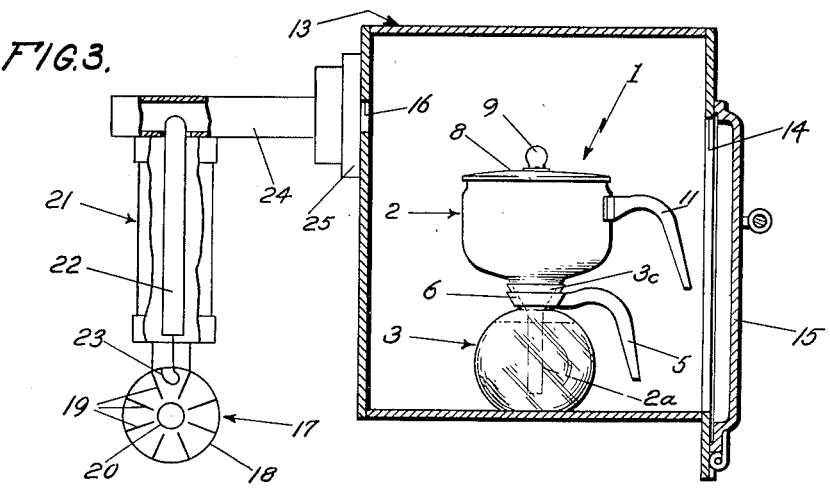
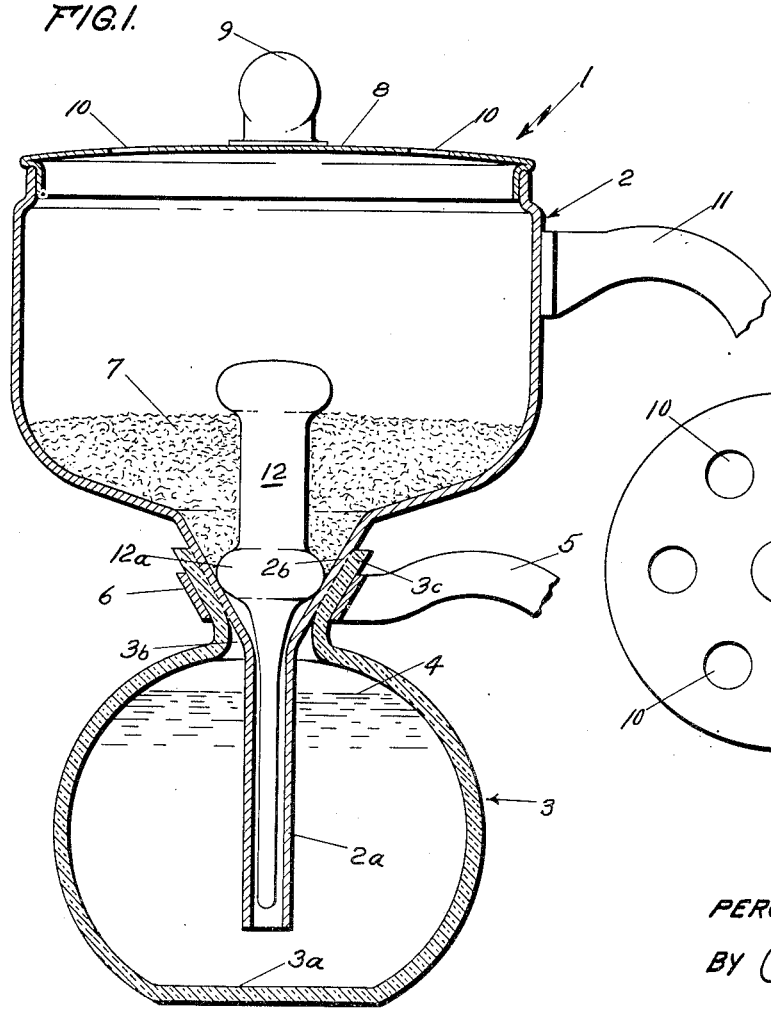
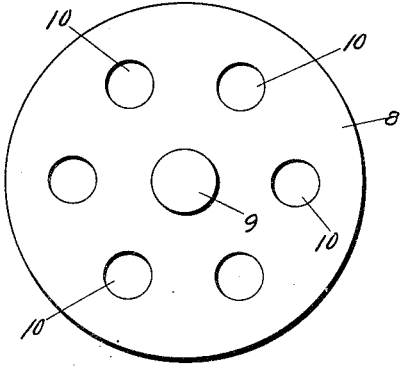
INVENTOR
PERCY L. SPENCER
BY Elmer J. Gorn
ATTORNEY Patented June 17, 1952

2,601,067

UNITED STATES PATENT OFFICE 2,601,067

COFFEE BREWING

Percy L. Spencer, West Newton, Mass., assignor to Raytheon Manufacturing Company, Newton, Mass., a corporation of Delaware Application March 24, 1948, Serial No. 16,840

3 Claims. (Cl. 99—292)

This invention relates to apparatus for coffee brewing, and more particularly to a method and means for brewing coffee by the use of electromagnetic wave energy, for example in the microwave region of the frequency spectrum.

An object of this invention is to devise apparatus for brewing coffee extremely rapidly, such coffee at the same time having an excellent flavor.

Another object is to devise apparatus for brewing coffee with the use of electromagnetic wave energy for heating purposes.

A further object is to devise apparatus for brewing coffee by the use of electromagnetic wave energy without burning the prepared coffee.

A still further object is to provide a novel vacuum-type coffee brewing device.

The foregoing and other objects of the present invention will be best understood from the following description of an exemplification thereof, reference being had to the accompanying drawing, wherein:

Fig. 1 is a central longitudinal section through a coffee brewing device according to this invention;

Fig. 2 is a top view of a closure member of Fig. 1; and

Fig. 3 is a sectional view through a microwave cooking oven showing the coffee brewing device of Fig. 1 therein while being utilized to brew coffee.

Now referring to Figs. 1 and 2, the numeral 1 generally indicates a coffee brewing device according to this invention. Device 1 is a two-section or two-container vacuum-type coffee brewer having an upper section or container 2 and a lower section or container 3.

The flask-like lower container 3, in which the water 4 is placed for coffee brewing purposes, is made of vitreous material, such as glass, and has a flattened base 3a, an upper open end or mouth 3b, and a neck 3c. A portion of the inner surface of neck 3c, adjacent the upper end thereof, has a tapered or frustro-conical shape as shown, and this portion is preferably ground to a smooth finish to provide a smooth seat on which upper container 2 may rest. A suitable handle 5 may be secured to the upper frustro-conical or neck portion 3c of container 3, as by means of a metallic ring 6 which firmly engages the periphery of said neck portion and is secured to handle 5 in any suitable manner.

The upper container 2, in which the dry ground coffee 7 is placed for coffee brewing purposes, is made of a highly conductive metal, such as copper. Container 2 has an upper open end which is normally closed by a removable cover 8, also made of a highly conductive metal, such as copper. Cover 8 has a handle 9 fixed thereto by which said cover may be manipulated. Said cover has a plurality of vent holes 10 of small diameter therein. A handle 11 is suitably secured, as by welding or brazing, to the outer cylindrical side wall of container 2.

Depending centrally from the main body portion of the upper container 2 is an integral tubular portion 2a which extends through mouth or opening 3b of lower container 3 into said lower container; the interiors of containers 2 and 3 are communicable with each other by means of said tubular portion. Tubular portion 2a is joined to the main body portion of container 2 by means of an integral tapered or frustro-conical portion 2b, the outer surface of portion 2b having a size and taper such that it mates with the inner surface of neck 3c to provide a leak-proof ground glass or metal-to-glass joint between the mating surfaces of containers 2 and 3, without the necessity of utilizing any gaskets.

A solid glass vertically-extending filter rod 12 has an enlarged bulbous portion 12a intermediate its ends which engages the inner surface of frustro-conical portion 2b, the outer surface of said bulbous portion being slightly roughened in accordance with the usual practice. The upper end of the filter rod 12 is enlarged for a handle, while the lower end of the said rod is of reduced diameter and extends downwardly from bulbous portion 12a concentrically of tube 2a but spaced from the inner wall of said tube.

Now referring to Fig. 3, this figure illustrates apparatus whereby the brewer 1 may be exposed as a unit to electromagnetic wave energy, or whereby both of the containers 2 and 3 may be exposed to such energy. A hollow rectangular prismoidal enclosure 13 is made of a suitable metal and has rather thin walls as shown; enclosure 13 is adapted to serve as the oven of the electronic heating or cooking apparatus. The device 1 is placed in an upright position inside oven 13, said device resting on the bottom wall of the oven. In order to allow access to the interior of the oven for placing brewer 1 therein and for removing said brewer therefrom, an opening 14 is provided in the front wall of oven 13, this opening being closable by means of a hinged metal door 15. When door 15 is closed, the enclosure 13 is entirely closed, except for an opening 16 for the exciting means to be described hereinafter.

Numeral 17 generally designates an electron discharge device of the magnetron type, which includes, for example, an evacuated envelope 18, made of highly conductive material, such as copper, and provided with a plurality of inwardly-directed, radially-disposed anode vanes 19. The arrangement is such that each pair of adjacent anode vanes 19 forms, together with that portion of the envelope lying therebetween, a cavity resonator whose natural resonant frequency is, as is well-known to those skilled in the art, a function of the geometry of the physical elements making up the same. For the purposes of the present invention it is desirable that the dimensions of each such cavity resonator be such that the wavelength of the electrical oscillations adapted to be generated therein has a predetermined value, for example on the order of ten centimeters. Wavelengths of this order lie in the microwave region of the frequency spectrum. However, electromagnetic wave energy of longer or shorter wavelengths within or without the microwave region is equally applicable for this invention.

Centrally located in envelope 18 is a highly electron-emissive cathode member 20, for example of the well-known alkaline-earth metal oxide type, said cathode member being provided with conventional means (not shown) for raising the temperature thereof to a level sufficient for thermionic emission.

The electron discharge device 17 is completed by magnetic means (not shown) for establishing a magnetic field in a direction transversely of the electron path between the cathode and anode members thereof.

Magnetron 17 is energized from any suitable source (not shown) and when so energized delivers high frequency electromagnetic energy having a predetermined wavelength to a coaxial transmission line 21, the inner conductor 22 of which is coupled to oscillator 17 by a loop 23 and the outer conductor of which is connected to envelope 18. The high frequency electromagnetic waves are delivered in turn to a hollow rectangular waveguide 24 by transmission line 21; the central conductor 22 of line 21 extends into the interior of waveguide 24 near one end thereof, through an opening provided in one side wall of said guide, to serve as an exciting rod or exciting probe for said guide.

The end of guide 24 nearest this exciting rod is closed, while the opposite end of said guide is fastened to the rear wall of enclosure 13 by fastening means 25 and is open. The interior of guide 24 is placed in energy-transmitting relationship with the interior of cavity 13 by means of a rectangular aperture 16 provided in the rear wall of said cavity, this aperture being of the same size and configuration as the interior of guide 24 and being aligned with said guide to place the interior of said guide in communication with the interior of cavity 13.

Microwave energy is fed by coaxial line 21 and waveguide 24, from magnetron oscillator 17 to the interior of oven 13, thereby filling substantially the entire interior of enclosure 13 with electromagnetic wave energy, for example in the microwave region of the frequency spectrum. For a more complete explanation of the operation of such an oven, reference is hereby made to the copending Hall et al. application, Ser. No. 721,540, filed January 11, 1947, in which an electronic oven of the above type is disclosed and claimed.

In order to brew coffee by the method of the present invention, water is placed in the lower container 3 and dry ground coffee in the upper container 2 in the usual way, with filter rod 12 being inserted into the upper container. Thereafter, the device 1 is placed inside enclosure 13, the interior of which is filled with electromagnetic wave energy, in order to expose both of the containers 2 and 3 as a unit to electromagnetic wave energy.

The highly conductive or low loss metal of the upper container 2 acts to in effect reflect the microwave energy therefrom or to shield the coffee inside the same from such energy, thereby keeping such wave energy outside of the upper container and preventing adverse affecting of the coffee, such as burning or charring thereof, by the microwave electromagnetic energy inside enclosure 13. Due to the provision of the metallic cover 8 on container 2, the coffee is substantially completely shielded from the electromagnetic wave energy. The diameter of vent holes 10 is such that, taking into account the wavelength of the wave energy inside enclosure 13, these holes are too small to permit electromagnetic wave energy to pass through them, so that such holes do not interfere in any way with the wave-shielding or wave-reflecting action of the upper metallic container.

The material used for the vitreous or glass lower container 3 is highly transparent to electromagnetic wave energy, so that the energy inside enclosure 13 impinges on or is effectively applied to the water 4 in container 3, heating said water by such energy; when the water is sufficiently heated, it flows upwardly into the upper container 2 and there contacts the coffee 7. When the electromagnetic wave energy is turned off, the water cools and flows back down into the lower container 3 as brewed coffee, as is usual in brewers of this kind.

By the provision of a frusto-conical ground glass or metal-to-glass joint between portions 2b and 3c of the upper and lower containers as described, I am able to provide a leak-proof joint without the use of a rubber gasket, which gasket might be burned if it were in contact with the outer surface of the metallic container 2. Alternatively, instead of the ground glass joint, a gasket of a certain composition which would not so burn could be used, if desired.

Due to the fact that water is an excellent absorber of electromagnetic wave energy, particularly if the wavelength of such energy lies in the microwave region of the frequency spectrum, coffee may be brewed extremely rapidly by the apparatus of this invention. Also, since the dry prepared ground coffee is effectively shielded from electromagnetic wave energy at all times, no burning of such dry coffee can occur, so that the natural excellent flavor of the coffee is not adversely affected in any way. It will be seen that, in the exercise of the method according to this invention, electromagnetic wave energy is utilized for heating purposes in the brewing of the coffee.

Of course, it is to be understood that this invention is not limited to the particular details as described above, as many equivalents will suggest themselves to those skilled in the art. For example, instead of making the upper container 2 from solid metal as shown, such container could be made by plating a film of highly-conductive metal on a container made from any suitable material. Various other variations will suggest themselves. It is accordingly desired that the appended claims be given a broad interpretation commensurate with the scope of this invention within the art.

What is claimed is:

1. Apparatus for brewing coffee comprising a source of radiated microwave energy, a two-container vacuum-type coffee brewing device, the first container being metallic and being adapted to contain ground coffee and to shield said coffee from said energy, a second container permeable to microwave energy connected to said first container and a microwave energy reflector for directing energy from said source toward said brewing device.

2. Apparatus for brewing coffee comprising a source of radiated microwave energy, a two-container vacuum-type coffee brewing device, the first container being metallic and having a metallic cover and being adapted to contain ground coffee and to shield said coffee from said energy, a second container permeable to microwave energy connected to said first container, and a microwave energy reflector for concentrating and directing energy from said source toward said brewing device.

3. Apparatus for brewing coffee comprising a source of radiated microwave energy, a two-container vacuum-type coffee brewing device, the first container being metallic and having a metallic cover and being adapted to contain ground coffee and to shield said coffee from said energy, a second container permeable to microwave energy connected to said first container, and a substantially closed metallic cavity surrounding said brewing device and energized by microwave energy from said source.

PERCY L. SPENCER.

REFERENCES CITED

The following references are of record in the file of this patent:

UNITED STATES PATENTS

| Number | Name | Date |
|---|---|---|
| 1,180,881 | Ricciardelli | Apr. 25, 1916 |
| 1,203,661 | Task | Nov. 7, 1916 |
| 1,259,471 | Bachelder | Mar. 19, 1918 |
| 1,288,376 | Bleichrode | Dec. 17, 1918 |
| 1,634,705 | Bridges | July 5, 1927 |
| 1,674,857 | Emerson | June 26, 1928 |
| 1,900,573 | McArthur | Mar. 7, 1933 |
| 1,978,074 | Bogoslowsky | Oct. 23, 1934 |
| 2,047,172 | Coleman | July 14, 1936 |
| 2,103,469 | Kremer | Dec. 28, 1937 |
| 2,133,178 | Sieling | Oct. 11, 1938 |
| 2,158,587 | Nevius | May 16, 1939 |
| 2,359,405 | Cory | Oct. 13, 1944 |
| 2,413,003 | Sherman | Dec. 24, 1946 |
| 2,464,722 | Sacker | Mar. 15, 1949 |
| 2,532,460 | Phillips | Dec. 5, 1950 |

FOREIGN PATENTS

| Number | Country | Date |
|---|---|---|
| 501,867 | Great Britain | Mar. 7, 1939 |